United States Patent 3,658,952
ted Apr. 25, 1972

3,658,952
BIS[(DIALKYL)PHOSPHONOALKYLAMIDO] ALKYLS
Hermann Nachbur, Dornach, and Arthur Maeder, Therwil, Switzerland, assignors to Ciba Limited, Basel, Switzerland
No Drawing. Filed July 1, 1969, Ser. No. 838,329
Claims priority, application Switzerland, July 11, 1968, 10,365/68
Int. Cl. C07f 9/40; D06m 1/00
U.S. Cl. 260—932                                                9 Claims

ABSTRACT OF THE DISCLOSURE

Phosphorus-containing reaction products of a (methylene)- or (dimethylene ether)-bis-(dialkyl phosphonopropionic acid amide) and formaldehyde or a formaldehyde releasing agent, for flame-proofing fiber materials containing cellulose advantageously together with a curable aminoplast precondensate.

The subject of the invention are reaction products, containing phosphorus, from (a) a condensation product of (a') 50 to 100 mol percent of at least one compound of formula (1) 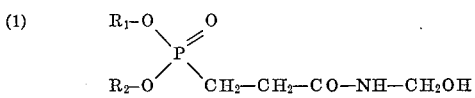

and (b') 0 to 50 mol percent a compound of formula (2) 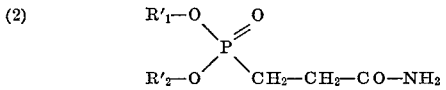

wherein $R_1$, $R_2$, $R_1'$ and $R_2'$ each denote an alkyl, halogenalkyl or alkenyl residue having at most 4 carbon atoms each, (b) formaldehyde or a reagent which releases formaldehyde and (c) optionally an alkanol having at most 4 carbon atoms.

The reaction products containing phosphorus are probably essentially phosphonopropionic acid amides of formula (3) 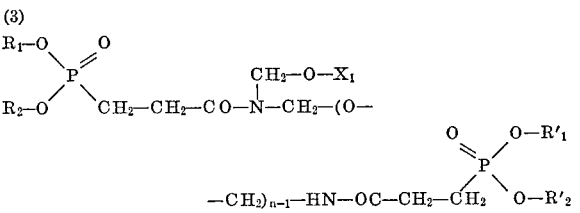

wherein $R_1$, $R_2$, $R_1'$ and $R_2'$ each denote an alkyl, halogenalkyl or alkenyl residue having at most 4 carbon atoms each and $X_1$ denotes a hydrogen atom or an alkyl residue having at most 4 carbon atoms and $n$ denotes 1 or 2.

At the same time phosphonopropionic acid amides of formula (4) 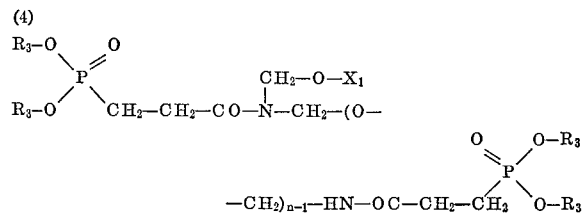

are preferred, wherein $R_3$ denotes a methyl or ethyl residue and $X_1$ and $n$ have the significance indicated.

Particularly suitable phosphonopropionic acid amides are also those of formula (5) 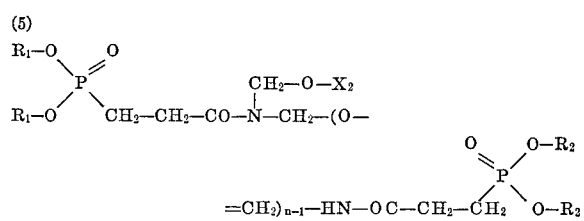

wherein $R_1$, $R_2$ and $n$ have the significance indicated and $X_2$ denotes a hydrogen atom or a methyl group.

Depending on whether $n=1$ or 2, the compounds of Formula 3 are phosphonopropionic acid amides of formulae (6) 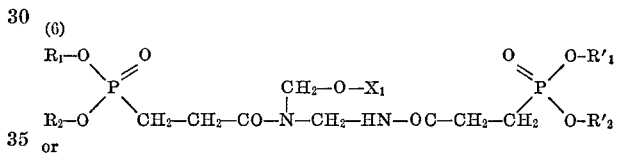

or (7) 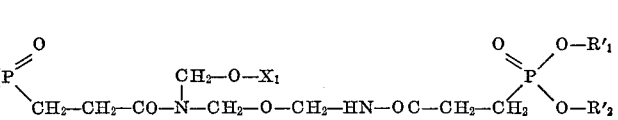

wherein $R_1$, $R_2$, $R_1'$, $R_2'$ and $X_1$ have the significance indicated.

Phosphonopropionic acid amides of formula (8) 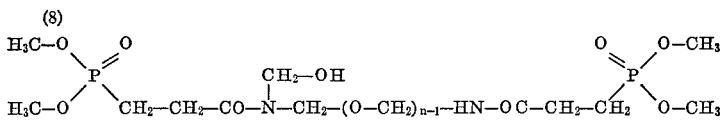

wherein $n$ denotes 1 or 2 are of very particular interest.

In Formulae 1 to 3 $R_1$, $R_2$, $R_1'$ and $R_2'$ can thus all be identical, partially identical with one another or all different from one another. Preferably $R_1$ and $R_2$ and/or $R_1'$ and $R_2'$ denote two identical residues of the composition indicated. In Formulae 5 to 7 $R_1$ and $R_2$ can again be mutually different or preferably identical. As examples, n-propyl, isopropyl, ethyl, methyl, allyl or chloralkyl groups such as 2-chlorethyl or 2,3-dichloropropyl groups may be mentioned.

In Formulae 3, 4, 6 and 7, $X_1$ can for example represent a n-butyl, ethyl or methyl group. Phosphonopropionic acid amides wherein $X_1$ denotes a methyl group or especially a hydrogen atom should however be highlighted.

The reaction products containing phosphorus, according to the invention, can be manufactured according to usual methods which are in themselves known, by reacting the condensation product (a) with formaldehyde or with a reagent releasing formaldehyde at elevated temperature, optionally in the presence of a basic catalyst, and optionally subsequently further etherifying it with an alcohol of formula (9)     X—OH wherein X represents an alkyl residue having at most 4 carbon atoms.

A compound of Formula 3 is obtained if a compound of formula (10)

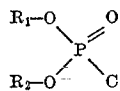 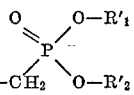

R₁—O\\P(=O)/O—R₂   CH₂—CH₂—CO—NH—CH₂—(O—CH₂)ₙ₋₁—HN—OC—CH₂—CH₂   O\\P(=O)/O—R'₁, O—R'₂ wherein R₁, R₂, R₁', R₂' and n have the significance indicated is reacted in the indicated manner with formaldehyde or with a reagent releasing formaldehyde and is optionally subsequently further etherified with an alcohol of Formula 9. The reaction of the condensation product (a) or of a compound of Formula 10 with formaldehyde or with a reagent releasing formaldehyde such as for example paraformaldehyde advantageously takes place at temperatures up to 150° C., preferably at 50 to 100° C.

This reaction is optionally carried out in the presence of a basic catalyst. Possible catalysts are both strong bases such as for example sodium or potassium hydroxide or sodium methylate and also weak bases such as for example sodium acetate, magnesium carbonate or especially magnesium oxide.

The amount of the monomethylol compound formed can be determined by determining the formaldehyde bonded as —CH₂OH. As a rule the yields of monomethylol compound are 80 to 97%.

Compounds of Formula 3 wherein R represents an alkyl residue having at most 4 carbon atoms are obtained by etherification of the monomethylol compound with a monohydric aliphatic alcohol which contains at most 4 carbon atoms, in the presence of an acid.

The starting substances of Formula 10 wherein $n=1$ are obtained by condensation of equimolar amounts of at least one compound of formula (11)

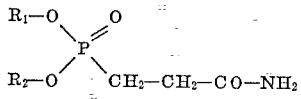

R₁—O\\P(=O)/O—R₂   CH₂—CH₂—CO—NH₂ with a compound of formula (12)

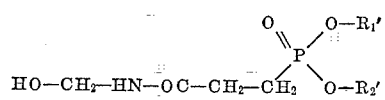

HO—CH₂—HN—OC—CH₂—CH₂   O\\P(=O)/O—R₁', O—R₂' wherein R₁, R₂, R₁' and R₂' have the significance indicated, with warming, appropriately in the presence of an organic solvent which forms an azeotrope with water, such as for example benzene or toluene.

If $n=2$, the starting substances of Formula 10 are obtained by condensation of 2 molecules of a compound of Formula 12 again with warming and appropriately in the presence of an organic solvent which forms an azeotrope with water.

The invention also relates to a process for the flameproofing of fibre materials containing cellulose, characterised in that an aqueous preparation which contains at least one phosphorus-containing reaction product of the indicated composition, or a phosphonopropionic acid amide of Formula 3, and optionally a curable aminoplast precondensate, is applied to these materials, and that the materials are thereafter dried and subjected to a treatment at elevated temperature.

In particular, the phosphorus-containing reaction products or the phosphonopropionic acid amides of Formula 3 are used for flameproofing textile material containing cellulose. Phosphonopropionic acid amides of Formulae 3 to 7 are preferred, and the process for flameproofing is of very particular interest if compounds of Formula 8 are used.

The pH-value of the aqueous preparations containing the phosphorus-containing reaction products or the compounds of Formula 3 is advantageously less than 5. In order to achieve this, strong mineral acids, such as sulphuric acid, nitric acid or preferably hydrochloric acid are added to the preparations. Instead of the acids themselves, especially hydrochloric acid, it is also possible to use compounds from which the corresponding acids are easily formed in water by hydrolysis, for example even without warming. Phosphorus trichloride, phosphorus pentachloride, phosphorus oxychloride, thionyl chloride, sulphuryl chloride, cyanuryl chloride, acetyl chloride and chloracetyl chloride may here be mentioned as examples. On hydrolysis these compounds exclusively yield acid decomposition products, for example cyanuric acid and hydrochloric acid. Now it can be advantageous to employ, instead of one of the strong acids mentioned, the acid mixtures corresponding to the hydrolysis products of one of the compounds just mentioned, that is to say for example to employ, instead of hydrochloric acid alone, a mixture of hydrochloric acid and orthophosphoric acid corresponding to phosphorus pentachloride, appropriately in a molecular ratio of 5:1.

In addition to the phosphorus-containing reaction products or the compounds of Formula 3 and the additives necessary for adjusting the pH-value, the preparations to be used in accordance with the invention may contain yet further substances. An addition of aminoplast pre-condensates is advantageous for achieving a good flameproofing finish which is wash-fast.

By aminoplast precondensates, addition products of formaldehyde to nitrogen compounds capable of methylolation are understood. 1,3,5-aminotriazines such as N-substituted melamines, for example N-butylmelamine, N-trihalogenomethylmelamines, as well as ammeline, guanamines, for example benzoguanamine, acetoguanamine or also diguanamines may be mentioned. Further possibilities are also: thiourea, alkylureas or arylureas and alkylthioureas or arylthioureas, alkyleneureas or alkylenediureas, for example ethyleneurea, propyleneurea, acetylenediurea or especially 4,5-dihydroxyimidazolidone-2 and derivatives thereof, for example the 4,5-dihydroxyimidazolidone-2 which is substituted by the residue

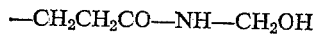
—CH₂CH₂CO—NH—CH₂OH at the hydroxyl group in the 4-position. The methylol compounds of a urea, of an ethyleneurea or of melamine are preferentially used. Particularly valuable products are in general yielded by products which are as highly methylolated as possible. Both predominantly monomolecular and also more highly pre-condensed aminoplasts are suitable as component (b).

The ethers of these aminoplast pre-condensates can also be employed together with the compounds of Formula 1. The ethers of alkanols such as methanol, ethanol, n-propanol, isopropanol, n-butanol or pentanols are for example advantageous. It is however advantageous for these aminoplast pre-condensates to be water-soluble, such as for example the pentamethylolmelamine-dimethyl ether.

Preferably, the preparations for flameproofing also contain a latent acid catalyst for accelerating the cure of the aminoplast pre-condensate and for crosslinking the phosphorus-containing reaction products, or the compounds of Formula 3. As latent acid catalysts, the catalysts known for curing aminoplasts on cellulose-containing material can be used, for example ammonium chloride, ammonium dihydrogen orthophosphate, magnesium chloride, zinc nitrate and others.

It can also be advantageous if the preparations contain a copolymer obtainable by polymerisation in aqueous emulsion from (a) 0.25 to 10% of an alkaline earth salt of an $\alpha,\beta$-ethylenically unsaturated monocarboxylic acid, (b) 0.25 to 30% of a N-methylolamide or N-methylolamide-ether of an $\alpha,\beta$-ethylenically unsaturated monocarboxylic or dicarboxylic acid and (c) 99.5 to 60% of at least one other copolymerisable compound. These copolymers and their manufacture are also known. The tear strength and abrasion resistance of the treated fibre material can be advantageously influenced by the conjoint use of such a copolymer.

As a further additive which is advantageous in some cases, a plasticising finishing agent, for example an aqueous polyethylene emulsion or ethylene copolymer emulsion, should be mentioned.

The content of phosphorus-containing reaction products or of compound of Formula 3 in the aqueous preparation is appropriately of such magnitude that 10 to 28% are applied to the material to be treated. Here it is necessary to take into account that the commercially available textile materials from native or regenerated cellulose can take up between 50 and 120% of an aqueous preparation.

The amount of the additive which is required to adjust the hydrogen ion concentration to a value of less than 5 depends on the selected value itself and on the nature of the additive, though it is in any case not possible to go below a certain minimum. A certain excess above this minimum amount is generally to be recommended. Large excesses do not offer any advantages and can even prove harmful.

If a polymer of the indicated nature is further added to the preparation, then this is appropriately done in small amounts, for example 1 to 10%, relative to the amount of the phosphorus-containing reaction product or of the compound of Formula 3. The same is true of an optional plasticiser, where the appropriate amounts can again be 1 to 10%.

The preparations are now applied to the cellulose-containing fibre materials, for example linen, cotton, acetate rayon, viscose rayon or also fibre mixtures of such materials and others such as wool, polyamide or polyester fibres, and this application can be effected in a manner which is in itself known. Preferably piece goods are used and impregnated on a padder of the usual construction, fed with the preparation at room temperature.

The fibre material impregnated in this way now has to be dried, and this preferably takes place at temperatures up to 100° C. Thereafter it is subjected to a dry heat treatment at temperatures above 100° C., for example between 130 and 200° C., and preferably between 150 and 180° C., the duration of which can be the shorter, the higher the temperature. This duration of heating is for example 2 to 6 minutes at temperatures of 150 to 180° C. Since the methylol residues or methylol-ether residues in the phosphorus-containing reaction products or in the compounds of Formula 1 are split during this process, water or an alcohol are at the same time produced. Now it has been found that these volatile decomposition products must be continuously removed from the material in order that the desired effect should be able to manifest itself fully. The devices in which the heat treatment is carried out must be chosen accordingly. Apparatuses in which fresh air is continuously introduced whilst maintaining the prescribed temperature, and in which the air charged with the resulting volatile substances is continuously removed, are very suitable. Such devices, for example so-called turbo-fixers or nozzle-fixers, are known.

A post-wash with an acid-binding reagent, preferably with aqueous sodium carbonate solution, for example at 40° C. up to the boiling point, and for 3 to 10 minutes, is appropriate in the case of a strongly acid reaction medium.

As already indicated, it is possible to obtain, according to the present process, flameproof finishes which remain largely preserved even after multiple washing or dry cleaning and which do not cause any unacceptable reduction in the mechanical textile properties of the treated material, especially if an aminoplast pre-condensate is conjointly used.

The percentages and parts in the examples which follow are units by weight unless otherwise specified. The relationship of the parts by volume to the parts by weight is as of ml. to g.

EXAMPLE 1

362 parts (2 mols) of 3-dimethylphosphonopropionamide and 422 parts (2 mols) of 3-dimethylphosphonopropionic acid methylolamide are suspended in 1000 parts of toluene in a stirred flask of capacity 2500 parts by volume, provided with a water separator. 4 parts of p-toluenesulphonic acid are further added and the mixture is heated to the boiling point of the toluene, with the water formed during the condensation being azeotropically removed and collected in the water separator. After 3½ hours reaction time no further water is formed. 33 parts of water are obtained (calculated: 36 parts). The toluene is thereafter removed in vacuo and 123 parts of 97.5% strength paraformaldehyde (4 mols) and 6 parts of solid sodium methylate are added to the residual melt and the mixture heated for 30 minutes to 100° C. internal temperature whilst stirring, with the water separator first being replaced by a reflux condenser. The mixture is then cooled to 60–65° C. and 800 parts of methanol are added. It is cooled to 10° C. whilst stirring rapidly and unreacted paraformaldehyde which has separated out is filtered off. The filtrate is evaporated in vacuo at 40° C.

860 parts of a clear yellowish syrup having a solids content of 96.3% are obtained.

| | Parts |
|---|---|
| Total CH$_2$O content | 50.3 |
| Free CH$_2$O content | 1.3 |
| Bonded CH$_2$O content | 49 | this probably corresponds to an 81 to 82% formation of the monomethylol compound of formula (13)

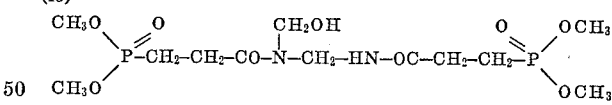

EXAMPLE 2

211 parts (1 mol) of 3-dimethylphosphonopropionic acid methylolamide are suspended in 200 parts of benzene in a stirred flask of capacity 500 parts by volume, provided with a water separator. 1 part of p-toluenesulphonic acid is further added and the mixture is heated to the boiling point of the benzene, with the water formed during the condensation being azeotropically removed and collected in the water separator. After 16 hours reaction time no further water is formed. The theoretical quantity of water (=9 parts) is obtained. The benzene is removed in vacuo, after which 203 parts of a syrupy opalescent product are obtained.

164 parts (0.4 mol) of the condensation product obtained above are mixed with 30 parts of aqueous formaldehyde (40% strength) (0.4 mol) in a stirred flask of capacity 250 parts by volume provided with a reflux condenser, thermometer and pH-electrode, and are methylolated for 2 hours at 60° C. A pH of 8.5 is maintained through dropwise addition of a total of 2 g. of 30% strength sodium hydroxide solution. After cooling to room temperature 196 parts of a slightly cloudy syrupy solution containing 89 to 90% of active substance are obtained. On the basis of the determined content of bonded formaldehyde one is probably dealing with a 95% formation of the monomethylol compound of formula

(14)
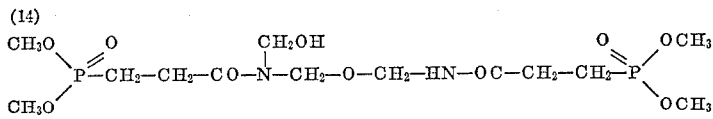

EXAMPLE 3

119.5 parts (0.5 mol) of 3-diethylphosphonomethylolpropionic acid amide and 104.5 parts (0.5 mol) of 3-diethyl-phosphonopropionic acid amide are suspended in 250 parts of toluene in a stirred flask of capacity 500 parts by volume, provided with a water separator and heated to the boiling point of the toluene. After completion of the water separation the toluene is removed in vacuo. 213 parts of reaction product are obtained.

107.5 parts (0.25 mole) of this reaction product are dissolved in 41.3 parts (0.5 mol) of 36.4% strength aqueous formaldehyde solution in a stirred flask of capacity 250 parts by volume, and are methylolated for 5 hours at 60° C. internal temperature and at a pH-value of 9 to 10.5. The pH is kept in the specified range by dropwise addition of a total of 0.7 part of 30% strength sodium hydroxide solution. After cooling to room temperature and filtering, a yellow clear solution containing 80% of active substance is obtained. On the basis of the determined content of bonded formaldehyde, a monomethylol compound of formula:

(15)
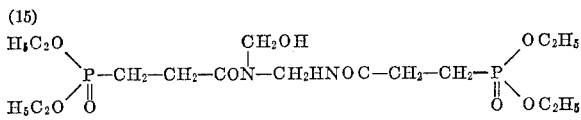

is probably present.

EXAMPLE 4

295 parts of bis-(2-chlorethyl)-phosphonopropionic acid methylolamide (0.95 mol) are suspended in 250 parts of benzene in a stirred flask of capacity 500 parts by volume provided with a water separator, and are heated to the boiling point of the benzene. Within 5 hours a total of 15.5 parts of water are formed (theory: 17 parts), and after this the mixture is cooled to 50° C. and the benzene removed in vacuo.

520 parts (0.91 mol) of this condensation product are mixed with 56.4 parts of 97% strength paraformaldehyde (1.82 mols) and heated to 90° C. internal temperature. Thereafter 10 parts of a 27% strength sodium methylate solution in methanol are added and the mixture treated at 100° C. for 1 hour. After cooling to room temperature a cloudy thick syrup is present, containing 98% of active substance. On the basis of the determined content of bonded formaldehyde, a monomethylol compound of formula:

(16)
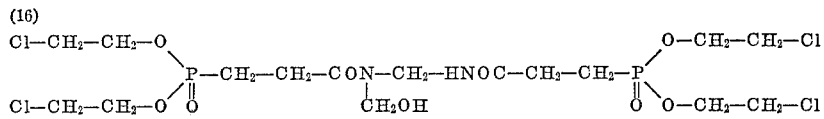

is probably present.

EXAMPLE 5

211 parts (1 mol) of 3-dimethylphosphonomethylolpropionic acid amide and 181 parts (1 mol) of 3-dimethylphosphonopropionic acid amide are mixed with 250 parts of benzene and 2 parts of p-toluenesulphonic acid in a stirred flask of capacity 500 parts by volume, provided with a water separator, and are heated to the boiling point of benzene. The calculated quantity of water (18 parts) is obtained over the course of 18 hours condensation time. Thereafter the benzene is removed in vacuo at 50° C. 160 parts of 37.5% strength aqueous formaldhyde solution (2 mols) are now added to the reaction product and methylolation carried out for 6 hours at 60° C. and at a pH-value of 8 to 8.5. The pH-value is kept within the indicated range by means of dropwise addition of 30% strength sodium hydroxide solution. After completion of the methylolation the water is completely removed in vacuo at 65° C.

On the basis of the determined bonded formaldehyde, the 100% strength product contains one —CH$_2$OH group.

415 parts of this compound are dissolved in 415 parts of methanol in a stirred flask of 1500 parts by volume. Thereafter hydrogen chloride gas is introduced at 25° C. until the pH of the solution is 2.5 and the mixture subsequently warmed to 70° C. internal temperature. Etherification is carried out for 1½ hours at pH 2.5 and 70° C., and thereafter the mixture is cooled to 60° C. and neutralised to pH 7.9 with 40 parts of sodium carbonate. The reaction solution is subsequently cooled to room temperature and filtered. Finally, the methanol is removed in vacuo at 40° C.

The opalescent syrupy product thus obtained contains almost 100% of active substance and probably corresponds to the formula:

(17)
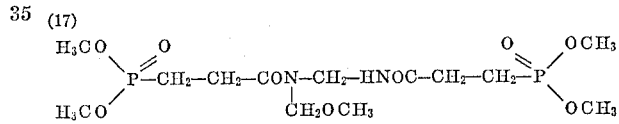

EXAMPLE 6

The procedure described in Example 1 is followed but the condensation is carried out in benzene and methylolation is carried out with aqueous formaldehyde. The mix and the reaction conditions correspond to those of Example 3 (without etherification).

The resulting product is not freed of the water of the formaldehyde solution. A solution of low viscosity containing 75% of active substance is obtained, corresponding to Formula 13 on the basis of the determined bonded formaldehyde.

EXAMPLE 7

A woven cotton fabric is padded with one of the aqueous liquors A and B of the table which follows. The liquor uptake is 80%. Drying is carried out at 70 to 80° C. followed by curing for 4½ minutes at 160° C. The woven fabric is now post-washed at the boil for 5 minutes in a solution containing 2 g. of anhydrous sodium carbonate per litre, rinsed and dried. A part of the woven fabric is boiled 5 times for 30 minutes in a solution containing 2 g. of sodium carbonate and 5 g. of soap per litre of water (5 SNV–4 washes).

The individual pieces of woven fabric are then tested for their flameproof properties (vertical test according to DIN 53906). The results of this test are also summarised in Table I below:

TABLE I

| Constituents | Preparation A | Preparation B |
|---|---|---|
| Product according to Example 1 (96%), g./l. | 320 | |
| Product according to Example 2 (87%), g./l. | | 380 |
| Pentamethylolmelamine dimethyl ether (60%), g./l. | 80 | 80 |
| Polyethylene emulsion (20% strength), g./l. | 20 | 20 |
| NH₄Cl, g./l. | 4 | 4 |
| pH of the preparation | 3.4 | 3.8 |
| Flameproof properties: | | |
| Unwashed: | | |
| Burning time (sec.) | 0 | 0 |
| Tear length (cm.) | 10.0 | 11.5 |
| After 5 SNV-4 washes: | | |
| Burning time (sec.) | 0 | 0 |
| Tear length (cm.) | 10.5 | 11.5 |

Using non-methylolated intermediate products according to Formula 7, no permanent flameproof effect is achieved on woven cotton fabrics.

EXAMPLE 8

A woven cotton fabric is padded with one of the aqueous liquors A to D of Table II. The liquor uptake is 80%. Drying is carried out at 70 to 80° C., followed by curing for 4½ minutes at 160° C. The woven fabric is now post-washed at the boil for 5 minutes in a solution containing 2 g. of anhydrous sodium carbonate per litre of water, rinsed and dried. A part of the woven fabric is boiled 5 times or 10 times for 30 minutes in a solution containing 2 g. of sodium carbonate and 5 g. of soap per litre of water (=SNV-4 washes).

The individual pieces of woven fabric are then tested for their flameproof properties (vertical test according to DIN 53906). The results of these tests are also summarised in Table II:

EXAMPLE 9

A viscose rayon woven fabric is treated with preparation A as described in Example 7, except that the woven fabric is washed according to Standard Specification SNV-3 (Standard Specification SNV-3=5 g./l. of soap+2 g./l. of soda, wash for 30 minutes at 60° C.) and is subsequently tested for its flameproof properties.

TABLE III

| Washing | Burning time in seconds | Tear length in cm. |
|---|---|---|
| a. After post-washing | 0 | 11 |
| b. After 5 SNV-3 washes | 0 | 10.5 |
| c. After 10 SNV-3 washes | 0 | 11.5 |

The flameproof properties are tested according to the vertical test DIN 53906 (ignition time 6 seconds). An untreated piece of woven viscose rayon fabric burns after the ignition.

What is claimed is:

1. A phosphorus-containing reaction product of the formula

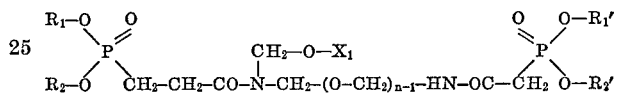

wherein R₁, R₂, R₁' and R₂' each denote an alkyl or chloroalkyl radical having at most 4 carbon atoms each or allyl, and X₁ denotes a hydrogen atom or an alkyl radical having at most 4 carbon atoms and $n$ denotes 1 or 2.

2. Phosphorus-containing reaction products according to claim 1, corresponding to the formula

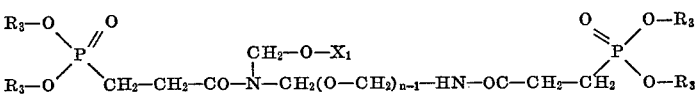

wherein R₃ denotes a methyl or ethyl radical.

3. Phosphorus-containing reaction products according to claim 1, corresponding to the formula

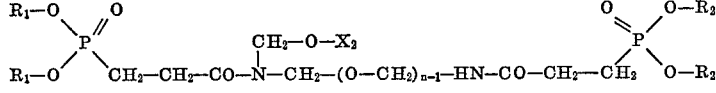

wherein X₂ denotes a hydrogen atom or a methyl group.

4. Phosphorus-containing reaction products according to claim 1, corresponding to the formula

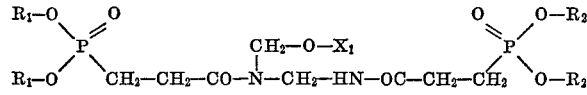

TABLE II

| Constituents | Untreated | Treated with preparation A | B | C | D |
|---|---|---|---|---|---|
| Product according to Example 3 (80%) g./l. | | 450 | | | |
| Product according to Example 4 (98%) g./l. | | | | | 480 |
| Product according to Example 5 (100%) g./l. | | | 330 | | |
| Product according to Example 6 (75%) g./l. | | | | 410 | |
| Pentamethylolmelamine dimethyl ether (60%) g./l. | | 80 | 80 | 80 | 80 |
| Polyethylene emulsion (20%) g./l. | | 20 | 20 | 20 | 20 |
| NH₄Cl, g./l. | | 4 | 4 | 4 | 4 |
| H₃PO₄ (85% strength) g./l. | | | 20 | | |
| pH of the preparation | | 4.1 | 3.1 | 4.2 | 2.3 |
| Flameproof properties: | | | | | |
| After post-washing: | | | | | |
| Burning time (sec.) | Burns | 0 | 0 | 0 | 0 |
| Tear length (cm.) | | 10 | 9 | 8 | 10 |
| Plus: after 5 SNV-4 washes: | | | | | |
| Burning time (sec.) | Burns | 0 | 0 | 0 | |
| Tear length (cm.) | | 9 | 8.5 | 8 | |
| Plus: after 10 SNV-4 washes: | | | | | |
| Burning time (sec.) | Burns | 0 | 0 | 0 | |
| Tear length (cm.) | | 10.5 | 11 | 9 | |

5. Phosphorus-containing reaction products according to claim 1, corresponding to the formula

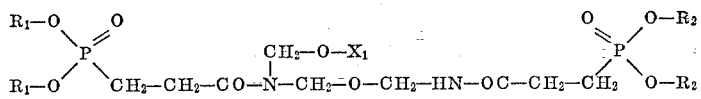

6. Phosphorus-containing reaction products according to claim 1, corresponding to the formula

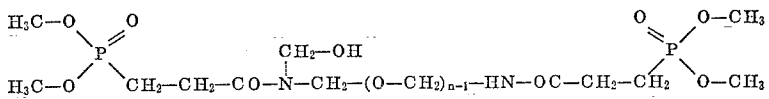

wherein $n$ denotes 1 or 2.

7. The phosphorus-containing reaction product according to claim 1, corresponding to the formula

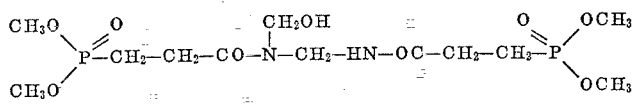

8. The phosphorus-containing reaction product according to claim 1, corresponding to the formula

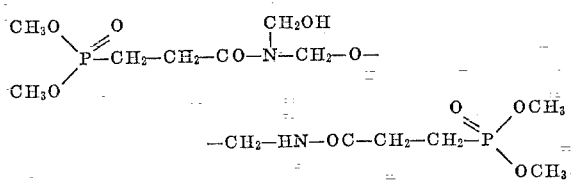

9. The phosphorus-containing reaction product according to claim 1, corresponding to the formula

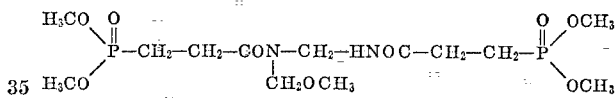

References Cited
FOREIGN PATENTS
1,049,372   1/1959   Germany _____ 260—932

JOSEPH REBOLD, Primary Examiner

A. H. SUTTO, Assistant Examiner

U.S. Cl. X.R.

106—15 FP; 117—137, 143 A; 260—943, 854, 968, DIG 24

CASE 6511/E

UNITED STATES PATENT OFFICE
CERTIFICATE OF CORRECTION

Patent No. 3,658,952          Dated April 25, 1972

Inventor(s) Hermann Nachbur et al

It is certified that error appears in the above-identified patent and that said Letters Patent are hereby corrected as shown below:

Column 2, in formula (5), "$(O-=CH_2)_{n-1}$" should be -- $(O-CH_2)_{n-1}$ --.

Column 10, the right-hand portion of the formula of claim 1 should read

Signed and sealed this 12th day of September 1972.

(SEAL)
Attest:

EDWARD M. FLETCHER, JR.        ROBERT GOTTSCHALK
Attesting Officer              Commissioner of Patents